United States Patent [19]

Sato

[11] Patent Number: 5,160,914

[45] Date of Patent: Nov. 3, 1992

[54] VEHICLE SECURITY SYSTEM WITH SPEED SENSOR AND DOOR INTERLOCK

[75] Inventor: Tsutomu Sato, Iwaki, Japan

[73] Assignee: Alpine Electronics, Inc., Iwaki, Japan

[21] Appl. No.: 628,515

[22] Filed: Dec. 17, 1990

[30] Foreign Application Priority Data

Dec. 18, 1989 [JP] Japan .................................. 1-328983

[51] Int. Cl.⁵ .............................................. B60R 25/10
[52] U.S. Cl. ...................................... 340/426; 340/430
[58] Field of Search ............. 340/426, 425.5, 428–430, 340/527, 528, 539; 307/10.2; 180/287

[56] References Cited

U.S. PATENT DOCUMENTS

| 4,383,242 | 5/1983 | Sassover .................... | 180/287 X |
| 4,691,801 | 9/1987 | Mann et al. ................ | 307/10.2 X |
| 4,866,417 | 9/1989 | Defino et al. .............. | 340/429 |
| 4,922,224 | 5/1990 | Drori et al. ................ | 340/426 X |

Primary Examiner—Jin F. Ng
Assistant Examiner—Brian R. Tumm
Attorney, Agent, or Firm—Guy W. Shoup; Norman R. Klivans; B. Noel Kivlin

[57] ABSTRACT

A vehicle security system includes a portable transmitter unit for transmitting either an arming signal or a disarming signal, a receiver unit mounted on the vehicle for receiving the arming or disarming signal from the transmitter unit, a detector for detecting vehicle speed, an arming-signal reception monitor unit capable of receiving the arming signal from the transmitter unit provided that the vehicle is not in motion, and a security control unit activated to arm the system in response to the arming signal transmitted from the transmitter unit when the arming-signal reception monitor unit can receive the arming signal. The system can be armed by on the arming signal from the transmitter unit only when the vehicle has zero speed and a door of the vehicle has just been opened or closed. Therefore, the security system is reliably prevented from being armed while the vehicle is being driven (i.e., has a measurable speed) and can also be armed if the vehicle is parked even if the ignition switch is turned on.

6 Claims, 4 Drawing Sheets

VEHICLE SECURITY SYSTEM WITH SPEED SENSOR AND DOOR INTERLOCK

BACKGROUND OF THE INVENTION

1. Field of the Invention

The present invention relates to a security system, and more particularly to a security system which can arm and/or disarm by use of a portable transmitter unit.

2. Description of the Related Art

An anti-theft system (which is also called "a security system") for preventing a vehicle from being stolen sounds a siren or flashes the vehicle headlights when a thief opens the door, gives a considerable shock to the vehicle or opens the trunk, and also cuts off the starter of the vehicle engine (de-energizes the engine) or cuts off the supply of fuel to the vehicle, thereby preventing the vehicle from being stolen.

An example of such a security system includes one in which initiation (hereinafter called "arming") or termination (hereinafter called "disarming") of the security operation is performed by a portable transmitter remote control unit (hereinafter "Remocon" unit). The arming and disarming of the security operation are effected by pressing either an arming key or a disarming key, both provided on the Remocon unit.

In such a security system using the Remocon unit, there is a situation where the system is armed by accidental operation of the Remocon unit by the driver or passenger while the vehicle is being driven, thereby bringing the security system into an active state (armed).

When the system is armed while the vehicle is being driven, a vehicle vibration sensor immediately detects vehicle vibrations. As a consequence, the siren suddenly sounds, the vehicle headlights are flashed, the starter is cut off or the supply of the fuel to the vehicle is cut off to thereby stop the vehicle, thus causing great danger.

Therefore, a conventional security system operates so as to avoid receiving all signals such as an arming signal or disarming signal transmitted from the Remocon unit when the ignition switch is turned on to enable the engine.

The conventional security system further has the following described deficiencies.

(1) When the security system is armed by the accidental operation of the Remocon unit when the ignition switch is not turned on, the security system is not in the intended state.

For example, when the security system is armed by the accidental operation of the Remocon unit when the ignition switch is off, the system determines that the movement of the driver or the passenger or the sound from an audio apparatus or the like is abnormal, thereby sounding the siren or flashing the vehicle headlight. Thus, the conventional security system cannot avoid the problem caused by the above-described accidental operation of the Remocon unit. When the passenger or someone unfamiliar with the Remocon unit operates the Remocon unit by accident, the alarm sounds continuously (cannot be stopped) due to the person's unfamiliarity with the Remocon unit, thereby causing serious inconvenience.

The above description is for the case where a Remocon unit located inside the vehicle is operated accidentally. On the other hand, when the Remocon unit is accidentally operated from outside the vehicle, there is the situation where the driver does not want to arm the security system. However, the conventional security system cannot avoid being armed in this situation.

(2) The Remocon unit is often provided with vehicle control keys including a window open/close key in addition to the arming and disarming keys.

However, the conventional security system has the deficiency that the vehicle control functions such as the window open/close control cannot be achieved by use of these keys while the vehicle is being driven.

SUMMARY OF THE INVENTION

It is an object of the present invention to provide a security system which can reliably be prevented from being armed by the accidental operation of a Remocon unit while a vehicle is being driven, and which can be armed even when the ignition switch is turned on when the vehicle is parked.

It is another object of the present invention to provide a security system which can avoid being armed by the accidental operation of a Remocon unit whether the vehicle is being driven or is parked.

According to the present invention, the above-described problem is solved by a security system comprising:

a portable transmitter unit for transmitting therefrom either a security-operation arming signal or a security-operation disarming signal;

a receiver unit mounted on the vehicle, for receiving the arming or disarming signal from the transmitter unit;

a detector for detecting the vehicle;

an arming-signal reception monitor unit capable of receiving the arming signal from the transmitter unit provided that the vehicle is parked; and a security control unit activated to arm the system in response to the arming signal transmitted from the transmitter unit when the arming-signal reception monitor unit can receive the arming signal.

Also, according to the present invention, the security system comprises:

a portable transmitter unit for transmitting therefrom either a security-operation arming signal or a security-operation disarming signal;

a receiver unit mounted on a vehicle, for receiving the arming or disarming signal from the transmitter unit;

a detector for detecting the degree of opening/closing of a vehicle door;

an arming-signal reception monitor unit capable of receiving the arming signal from the transmitter unit only during a predetermined time period after someone shuts the vehicle door; and a security control unit activated to arm the system in response to the arming signal transmitted from the transmitter unit only during the arming-signal receivable period and to disarm the system upon receipt of the disarming signal.

The security system can receive the arming signal from the transmitter unit only when the vehicle is being driven, and arms the system in response to the arming signal transmitted from the transmitter unit when the system is in the arming-signal receivable state.

Further, the security system can receive the arming signal from the transmitter unit only during a predetermined period of time (for example, 10 seconds) after the door is closed. In addition, the security system is armed in response to the arming signal transmitted from the transmitter unit only during the arming-signal receivable period. It is sufficient to arm the system within 10 seconds after the door is shut upon the driver leaving his vehicle. In addition, even when arming of the system cannot be accomplished within the predetermined time referred to above, this is not a significant problem. According to the present invention, the security system cannot be armed after 10 seconds have elapsed, thus eliminating problems due to the accidental operation of the Remocon unit.

According to one aspect of the present invention, as described above, the security system arms itself in response to the arming signal from the transmitter unit while the vehicle is parked. Therefore, the security system is reliably prevented from being armed while the vehicle is being driven and can also be armed if the vehicle is parked even if the ignition switch is turned on.

According to another aspect of the present invention, the security system can receive the arming signal from the transmitter unit (Remocon unit) and arm the system only during a predetermined period of time after the door is closed, without using the detector for detecting the vehicle speed. The security system can be armed in response to the arming signal transmitted from the transmitter unit only during the predetermined period during which it can receive the arming signal. If the predetermined period of time has passed after the driver takes his seat and shuts the door, the security system cannot be armed whether the vehicle is being driven or the engine is stopped, thus eliminating problems caused by accidental operation of the Remocon unit.

Further, according to the present invention, the system can always receive signals other than the arming signal transmitted from the Remocon unit, thereby overcoming the problem in the prior art that the vehicle cannot be controlled by using the Remocon unit while being driven.

The above and other objects, features and advantages of the present invention will be apparent from the following description and the appended claims, taken in conjunction with the accompanying drawings in which a preferred embodiment of the present invention is shown by way of example.

DETAILED DESCRIPTION OF THE PREFERRED EMBODIMENT

Figure 1:
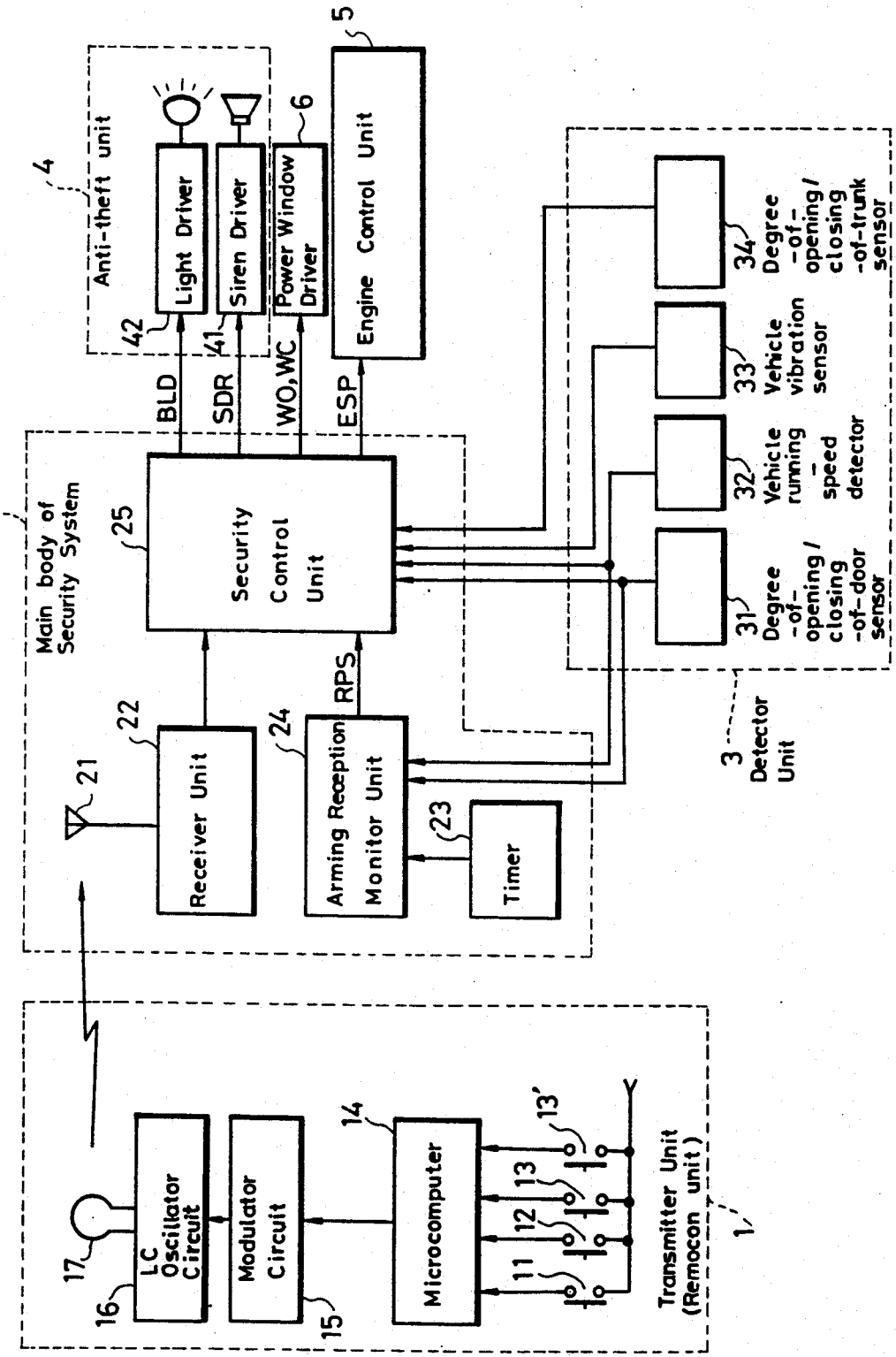
FIG. 1 is a block diagram showing a security system according to one embodiment of the present invention.

FIG. 1 is a block diagram showing a security system according to one embodiment of the present invention. A portable transmitter unit (Remocon Unit) 1 transmits an arming signal, a disarming signal and window open/close signals to a main body 2 of the security system mounted on a vehicle by pressing keys. Shown are an arming key 11, a disarming key 12, a window open key 13, a window close key 13', a microcomputer 14 used to conventionally generate a code according to the key pressed, a modulator circuit 15 to amplitude-modulate the code input from the micro-computer 14 by a carrier of a predetermined frequency, and an LC oscillator circuit 16 to perform the power amplification of the modulated signal for radiating a wave representative of the signal thus power-amplified into space from a loop antenna 17 connected to an output side of the oscillator circuit 16. In one embodiment, the arming key and the disarming key are common. When the system is armed, the common key is used as the disarming key. On the other hand, when the system is disarmed, the common key is employed as the arming key.

Operation of this system is as follows: (1) The security system can receive an arming signal from the transmitter unit 1 only during a predetermined period of time length T after the driver stops the vehicle and shuts the vehicle door. Then, the security system arms itself in response to the arming signal transmitted from the transmitter unit 1 in a state when the system can receive the same. (2) The security system can always receive other signals, and disarms itself in response to the disarming signal. (3) The security system controls a desired function of the vehicle in response to vehicle control signals such a window open/close signal, etc. The time T referred to above is about 60 seconds in one embodiment. It is deemed sufficient to arm the system if arming can be done within 60 seconds after the driver shuts the door upon leaving the vehicle. In addition, even when the arming of the system cannot be performed within that time, this is not a serious problem.

Main body 2 of the security system includes an antenna 21, a receiver unit 22 to receive a signal transmitted from the transmitter unit 1 for thereby demodulating the same therein, a timer 23, and an arming-signal reception monitor unit 24 capable of receiving an arming signal or instruction from the transmitter unit 1 only within a predetermined period after the driver stops the vehicle's engine and shuts the door.

Security control unit 25 arms the system in response to the arming instruction transmitted from the transmitter unit 1 only when the system is in a state in which it can receive the arming instruction (i.e., when a reception-enable or receptible signal RPS is in a high-level state). The security control unit 25 can always receive other instructions and disarms the system upon receipt of a disarming instruction. Further, the security control unit 25 controls various functions of the vehicle using vehicle control instructions such as a window open/close instruction, etc.

A detector unit 3 detects the degree of opening/closing of the door, the speed of the vehicle, the vibration of the vehicle, the degree of opening/closing of the trunk, etc. The detector unit 3 is provided with a degree-of-opening/closing-of-door sensor 31, a vehicle running-speed detector 32, a vehicle vibration sensor 33, a degree-of-opening/closing-of-trunk sensor 34, and similar sensors.

Figure 2:
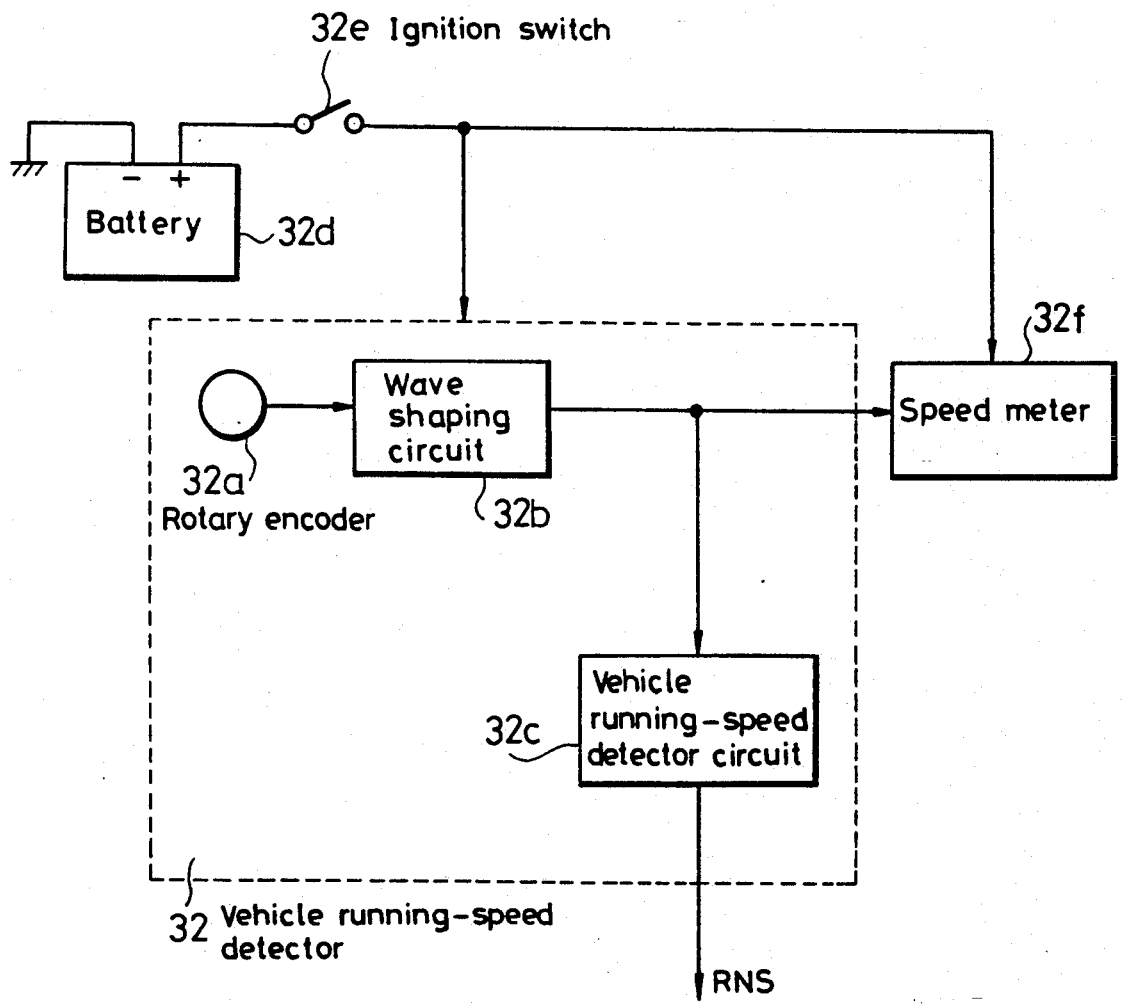
FIG. 2 is a block diagram of a vehicle running-speed detector.

As shown in FIG. 2, the vehicle running-speed detector 32 comprises a rotary encoder 32a which rotates in accordance with the rotation of the vehicle's wheels to generate a sine wave signal representative of a frequency proportional to the speed of the vehicle, a wave shaping circuit 32b for wave-shaping an output signal of the encoder in the form of a sequence of pulses, and a vehicle running-speed detector circuit 32c to monitor whether or not a pulse is produced within a predetermined period of time (this time is determined where the running speed is taken as being 1 Km/hour or more while the vehicle is being driven) for outputting therefrom a during-running signal RNS having a high level whenever at least one pulse is produced. Also shown are a battery 32d, an ignition switch 32e and a speed meter 32f in FIG. 2. A battery voltage is applied to the vehicle running-speed detector 32 via the ignition switch 32e. Therefore, when the ignition switch 32e is turned off, no voltage is supplied to the vehicle running-speed detector 32, and hence no pulse is generated from the wave-shaping circuit 32b.

Anti-theft unit 4 (see FIG. 1) comprises a siren driver 41 for sounding a siren in response to a siren drive signal SDR outputted from the security control unit 25 when a malfunction (for example, an undesired opened/-closed state of the door, the vibration of the vehicle, an improper running speed, an undesired opened/closed state of the trunk, etc.) is detected by the respective sensors as well as the vehicle running-speed detector as long as the system is armed, and a light driver 42 for flashing the headlights in response to a flashing drive signal BLD.

When any of the sensors or the vehicle running-speed detector detect the sought-for condition when the system is armed, engine control unit 5 cuts off the engine from starting or cuts off the fuel supply in response to a signal ESP output from the security control unit 25, thereby inhibiting the engine from starting.

A window driver 6 opens and/or closes a vehicle window when the main body 2 of the security system receives the window open/close instruction delivered from the Remocon unit 1.

Figure 3A:
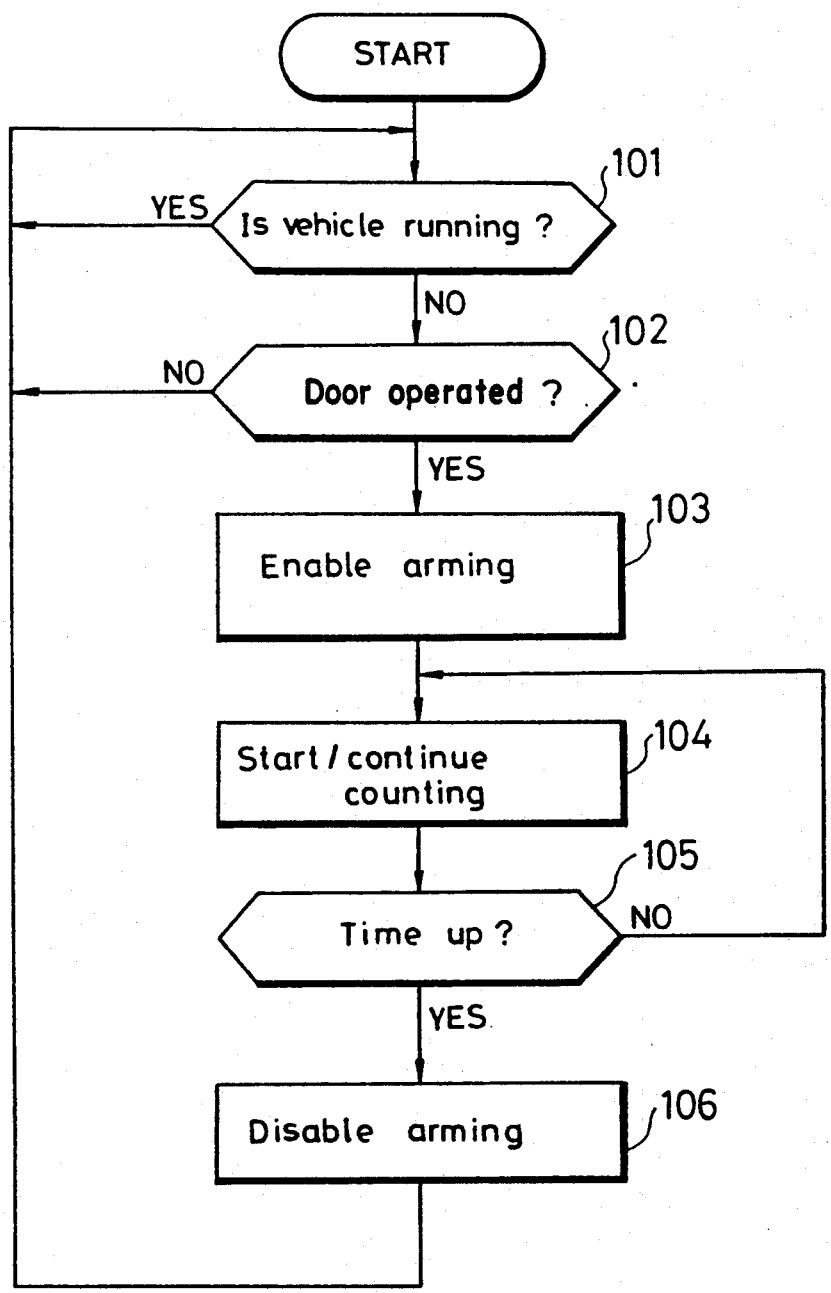
FIGS. 3(a) and 3(b) are flow charts describing the dearming operation according to the present invention.
Figure 3B:
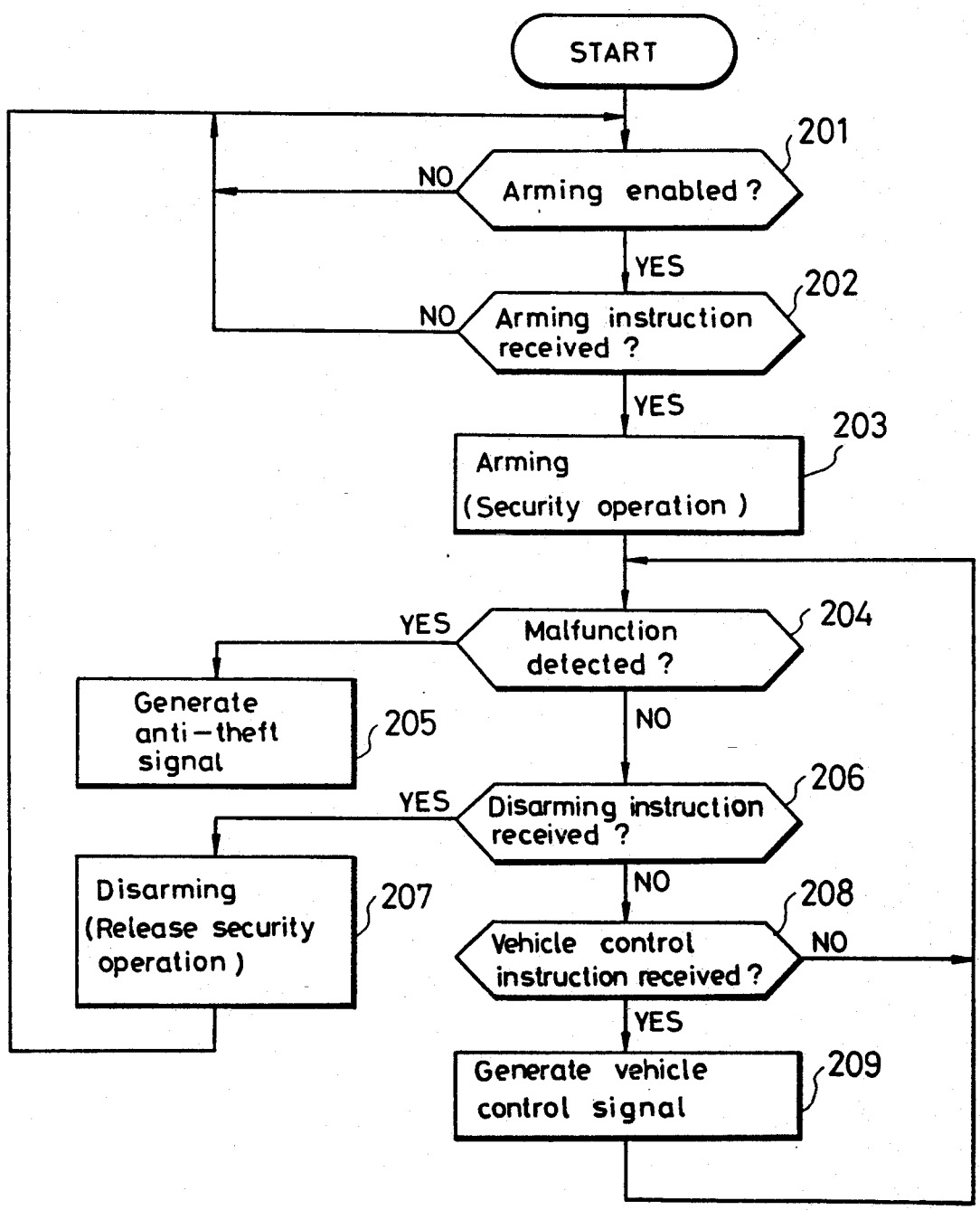

FIGS. 3(a) and 3(b) are flow charts of the arming operation according to the present invention. FIG. 3(a) is a flow chart for processing of the arming-signal reception monitor unit 24, and FIG. 3(b) is a flow chart for processing of the security control unit 25. The overall operation of the security system shown in FIG. 1 is described in accordance with these flow charts.

The system is disarmed when in an initial condition or starting state. Thus, the arming-signal reception monitor unit 24 renders the receptible signal RPS low in level. Therefore, the security control unit 25 does not arm the system even when the arming instruction is received from the Remocon unit 1. In this state, the arming-signal reception monitor unit 24 monitors whether or not the vehicle is being driven (in Step 101) and whether or not the door is changed from an open state to a closed state (in Step 102) based on outputs from the vehicle running-speed detector 32 and the degree-of-opening/closing-of-door sensor 31.

When the vehicle is not being driven (i.e., when the vehicle is parked) and the door is closed, the arming-signal reception monitor unit 24 renders the signal RPS high in level to enable the arming of the security system (in Step 103) and to start counting the time (in Step 104).

Then, the arming-signal reception monitor unit 24 checks whether or not the predetermined period of time T, for example 60 seconds, has elapsed since it has started counting the time (in Step 105). If Step 105 is negative, the arming-signal reception monitor unit 24 continues to count the time. If Step 105 is positive, it renders the receptible signal RPS low in level to thereby disable the arming of the system (in Step 106). Thereafter, the process returns to Step 101 and the subsequent processing is repeated. In the above-described procedure, the arming-signal reception monitor unit 24 enables the arming of the system only during the predetermined period of time after the door has been closed while the vehicle is parked. However, the arming-signal reception monitor unit 24 may in one embodiment enable arming of the system while the vehicle is parked regardless of the closing operation of the door. However, in the embodiment where the clos-ing of the door is a necessary condition for the arming of the system, the security system is prevented from being armed even if the Remocon unit is accidentally operated while the vehicle is parked when the driver is waiting for a traffic light, for example.

The security control unit 25 refers to the level of the receptible signal RPS to thereby monitor whether or not the system is in an arming enabled state (in Step 201). When the signal RPS is rendered high in level after the door has been closed while the vehicle is parked to thereby bring the system into the arming enabled state, the security control unit 25 checks if the arming instruction has been received from the Remocon unit 1 (in Step 202). If Step 202 is negative, the procedure returns to Step 201 and the subsequent processing is repeated.

When the arming instruction is received from the Remocon unit 1 in the arming enable state, Step 202 is positive. Thus, the security control unit 25 is brought into a security active state (in Step 203). Thereafter, the security control unit 25 monitors whether or not a malfunction has been detected based on the output of the sensors (in Step 204). If Step 204 is positive, the security control unit 25 outputs the siren drive signal SDR and the flashing drive signal BLD and also produces the engine start prohibition signal ESP, thereby preventing the vehicle from being stolen (in Step 205).

On the other hand, if Step 204 is negative, the security control unit 25 checks whether or not the disarming instruction has been received (in Step 206). If Step 206 is positive, the system is disarmed (in Step 207), and the procedure is returned to Step 201. If it is determined that the disarming signal has not been received, the security control unit 25 checks if the window open/-close instruction has been received (in Step 208). If it is determined that the window open/close instruction has not been received, the procedure subsequent to Step 204 is performed repeatedly. If Step 208 is positive, the security control unit 25 outputs a window opening signal WO or a closing signal WC to thereby open and/or close a window. Thereafter, the procedure subsequent to Step 209 is performed repeatedly.

The vehicle speed is detected by the vehicle running-speed detector or sensor in the above-described embodiment; vehicle speed may alternately be detected by an acceleration sensor.

Having now described the invention, it will be apparent to those skilled in the art that many changes and modifications can be made without departing from the spirit or scope of the invention as set forth herein.

What is claimed is:

1. A vehicle security system comprising:
    a portable transmitter for transmitting an arming signal for arming the system;
    a speed sensor for detecting the speed of the vehicle;
    means mounted on the vehicle for receiving the arming signal and arming the system in response thereto; and
    means for preventing arming unless the speed sensor detects a speed below a predetermined amount.
2. The system of claim 1, further comprising:
    means for detecting operation of a door of the vehicle;
    wherein the means for preventing arming prevents arming unless the arming signal is received within a predetermined time of the detection of operation of the door.

3. The system of claim 1, wherein the portable transmitter also transmits a disarming signal for disarming the system, and wherein the means for receiving includes means for disarming the system upon receipt of the disarming signal at any time the system is armed.

4. The system of claim 3, wherein the portable transmitter also transmits vehicle control signals, and wherein the means for receiving includes means for performing vehicle control functions upon receipt of the vehicle control signals at any time.

5. A vehicle security system comprising:
- a portable transmitter for transmitting an arming signal for arming the system;
- a sensor for detecting operation of a door of the vehicle;
- means mounted on the vehicle for receiving the arming signal and arming the system in response thereto; and
- means for preventing arming unless the arming signal is received within a predetermined time of the detection of operation of the door.

6. A vehicle security system comprising:
- a portable transmitter for transmitting an arming signal for arming the system;
- a speed sensor for detecting the speed of the vehicle;
- a unit on the vehicle for receiving the arming signal and arming the system in response thereto, and for preventing arming unless the detected speed is less than a predetermined amount; and
- a detector for detecting operation of a door of the vehicle;
- wherein the unit also prevents arming unless the arming signal is received within a predetermined time of the detection of operation of the door.

* * * * *